(12) United States Patent
Dietrich et al.

(10) Patent No.: US 7,836,542 B2
(45) Date of Patent: Nov. 23, 2010

(54) WIPER BLADE

(75) Inventors: Jan Dietrich, Buehl (DE); Wilhelm Fangmeier, Wolfsburg (DE)

(73) Assignees: Robert Bosch GmbH, Stuttgart (DE); Volkswagen AG, Wolfsburg (DE)

( * ) Notice: Subject to any disclaimer, the term of this patent is extended or adjusted under 35 U.S.C. 154(b) by 779 days.

(21) Appl. No.: 11/576,586

(22) PCT Filed: Sep. 28, 2005

(86) PCT No.: PCT/EP2005/054873

§ 371 (c)(1),
(2), (4) Date: Apr. 3, 2007

(87) PCT Pub. No.: WO2006/040259

PCT Pub. Date: Apr. 20, 2006

(65) Prior Publication Data

US 2008/0178409 A1    Jul. 31, 2008

(30) Foreign Application Priority Data

Oct. 14, 2004    (DE)    ........... 10 2004 050 163

(51) Int. Cl.
B60S 1/38    (2006.01)
(52) U.S. Cl. .................. 15/250.43; 15/250.48; 15/245
(58) Field of Classification Search .............. 15/250.41, 15/250.48, 250.361, 250.451, 250.452, 245, 15/250.43, 250.44; D12/219, 220
See application file for complete search history.

(56) References Cited

U.S. PATENT DOCUMENTS 3,082,464 A * 3/1963 Smithers ............. 15/250.201
3,414,930 A    12/1968 Kodama
3,902,216 A    9/1975 Stratton

FOREIGN PATENT DOCUMENTS

| CN | 1091094 A | 8/1994 |
|---|---|---|
| DE | 1157499 | 11/1963 |
| DE | 1505397 | 10/1969 |
| DE | 9104461.8 | 8/1992 |
| DE | 102005009205 | 10/2005 |
| EP | 0744326 | 11/1996 |
| FR | 1096321 | 6/1955 |
| GB | 965654 * | 8/1964 |
| GB | 2093339 * | 9/1982 |
| JP | 61085245 | 4/1986 |
| JP | 1112159 | 7/1989 |
| JP | 7186893 | 7/1995 |
| JP | 8310352 | 11/1996 |
| JP | 9193750 | 7/1997 |

(Continued)

OTHER PUBLICATIONS

International Search Report from the European Patent Office.

*Primary Examiner*—Gary K Graham
(74) *Attorney, Agent, or Firm*—Michael Best & Friedrich LLP

(57) ABSTRACT

A wiper blade (10) comprising a wiper strip (24) that is provided with a folding wedge (38) and a wiper strip back (34) that are connected to each other via a tilting web (36). It is proposed that additional webs (42) be arranged lateral to the tilting web (36).

22 Claims, 3 Drawing Sheets

FOREIGN PATENT DOCUMENTS

| | | |
|---|---|---|
| JP | 3629559 | 8/1997 |
| JP | 9328058 | 12/1997 |
| JP | 2000335376 | 12/2000 |
| JP | 2004017910 | 1/2004 |
| JP | 2004189185 | 7/2004 |
| JP | 2000177540 | 6/2006 |
| WO | 99/07586 | 2/1999 |

* cited by examiner

WIPER BLADE

BACKGROUND OF THE INVENTION

The invention relates to a windshield wiper device. In the case of such wiper blades with an elastic, band-like supporting element, said supporting element is supposed to guarantee the most uniform possible distribution of the wiper blade application force originating from the wiper arm on the window over the entire wiper field being covered by the wiper blade. Because of a corresponding curvature of the unstressed supporting element—i.e., when the wiper blade is adjacent to the window only at its two ends—the ends of the wiper strip that are applied completely to the window during wiper blade operation are stressed by the then tensioned supporting element on the window, even if the curvature radii of spherically curved vehicle windows change with every wiper blade position. The curvature of the wiper blade must therefore be somewhat greater than the greatest curvature measured in the wiper field on the to-be-wiped window, because during wiper operation, the wiper strip, or its wiper lip that is adjacent to the window, must always press against the window with a specific force. The supporting element thereby replaces the expensive supporting bracket design with two spring rails arranged in the wiper strip as is the practice with conventional wiper blades ([German Laid Open Print] DE-OS 15 05 397), because, in addition to distributing the application force, the supporting element also provides the required transverse reinforcement of the rubber elastic wiper strip. In the case of the known wiper blade, a bearing force exerted by a wiper arm on the main bracket and directed to the window is transmitted to two claw brackets and distributed by these to the rubber elastic wiper strip via four claws.

In the case of wiper blades with spring elastic supporting elements, the supporting element features a spring elasticity in the direction of the vehicle windows and a certain flexural strength in the direction of the wiper movement.

In the working position, the wiper blade is stressed in the direction towards the vehicle window by the application force of the wiper arm, wherein the wiper lip abuts the vehicle window.

A force generated by the rotating movement acts laterally on the rubber profile during wiping. While the wiper strip back is moved by the side force, the wiper lip remains in its position to begin with. In the process, the thin web between the wiper strip back and the folding wedge acts as a tilting joint because of its high elastic ductility so that the wiper lip on the folding wedge assumes an attack angle of 55 degrees to the glass surface. This trailing position is the wiper lip's operating position. The folding wedge is tilted over so far in this position until it abuts the lower side of the wiper strip back with its outer upper shoulder. Because of the oscillating wiping movement of the windshield wipers, reversing points are produced at the end positions of the movement. Here the folding wedge folds back in the opposite direction and then assumes a trailing working position again. An annoying folding-back noise is generated in particular in wiper blades with a spring elastic supporting element because of this folding-back process. In addition, the wiper rubber is very heavily elastically deformed in the area of the tilting web. Over the course of the deployment time this leads to a permanent deformation of the wiper rubber profile, which at first only negatively impacts the wiping effect of the windshield wiper, but later can even prevent the folding back.

A wiper strip is known from DE 9104461.8 U1 in which a damping strip is provided between the wiper strip back and the impacting shoulder of the folding wedge. When the folding wedge of the wiper strip folds back at the reversing point, the shoulder first impacts the damping strip and presses it until it comes to bear against the wiper strip back. As a result, the impact speed is slowed and the noise of folding back is dampened. In wiper blades with spring elastic supporting elements, this damping does not always suffice however. The folding-back noise is particularly annoying in the case of very long wiper blades.

SUMMARY OF THE INVENTION

The advantage of the wiper blade in accordance with the invention is that the additional webs arranged lateral to the tilting web continuously dampen the folding process by exerting on the folding wedge with an increasing tilt an increased compressive force on the one side or an increased tensile force on the other side. As a result, this prevents, for one, as desired, the shoulder of the folding wedge from impacting against the shoulder of the wiper strip back at full speed, whereby the annoying folding-back noise can effectively be prevented. Secondly, the constant force on the folding wedge that is in the trailing position causes the folding back as such to take place reliably at the turning point. Particularly in the case of wiper blades that have already been exposed to environmental conditions for a longer period of time, there can sometimes be problems in this case.

Moreover, it has been shown that the partial interruption of the grooves located left and right next to the tilting web by the webs improves the winter suitability of the wiper blade, because ice and snow can be worked out of the grooves more effectively by the movement of the wiper blade.

Advantageous developments of the wiper blade in accordance with the invention are possible. In particular, the manufacturability of the wiper blade or the wiper blade rubber is improved if the webs are arranged perpendicular to the tilting web.

The arrangement of the webs on both sides of the tilting web guarantees that the planned trailing position is achieved in both the upward as well as the downward movement and wiping quality is equally good. If the webs are arranged offset from one another on the two sides, the forces along the tilting web are distributed uniformly. Furthermore, this counteracts any possible resonances arising from unfavorable wind conditions. A distance of the webs from one another of between 10 mm and 50 mm has turned out to be optimal.

The webs can then be arranged in not too great intervals if the thickness of the webs is less than the thickness of the tilting web. This assures that the tilting of the folding wedge actually occurs along the entire spring strip.

In the simplest form, which is also favorable for manufacturing, the webs connect an outer edge of the wiper strip body with an outer edge of the folding wedge in a straight line. The spring characteristic of the webs can be influenced to the effect that this straight line can be embodied, e.g., as a concave profile or the webs can run diagonally into the grooves.

These shapes can also react to the wind noises that arise during travel when the air stream flows along the grooves and is influenced by the outer sides of the web. Moreover, the shape of this line—straight, bent, upwards diagonally, downwards diagonally—can influence the temporal progression of the effect of the force of the webs on the folding wedge during fold back. However, this can also be achieved in that the webs partially disappear in the groove or are offset toward the back.

In order to prevent the tensile force from becoming too great on the one side, the webs can be formed on only one side, i.e., each web is only formed on the wiper strip back or on the folding wedge and its other side is merely adjacent to the folding wedge or the wiper strip back or even has a small gap. Naturally, it can also be advantageous if successive webs are formed on the top or the bottom alternatingly.

BRIEF DESCRIPTION OF THE DRAWINGS

The drawings show:

FIGS. 7 and 8 Variations of FIG. 6, and.

DETAILED DESCRIPTION

Figure 1:
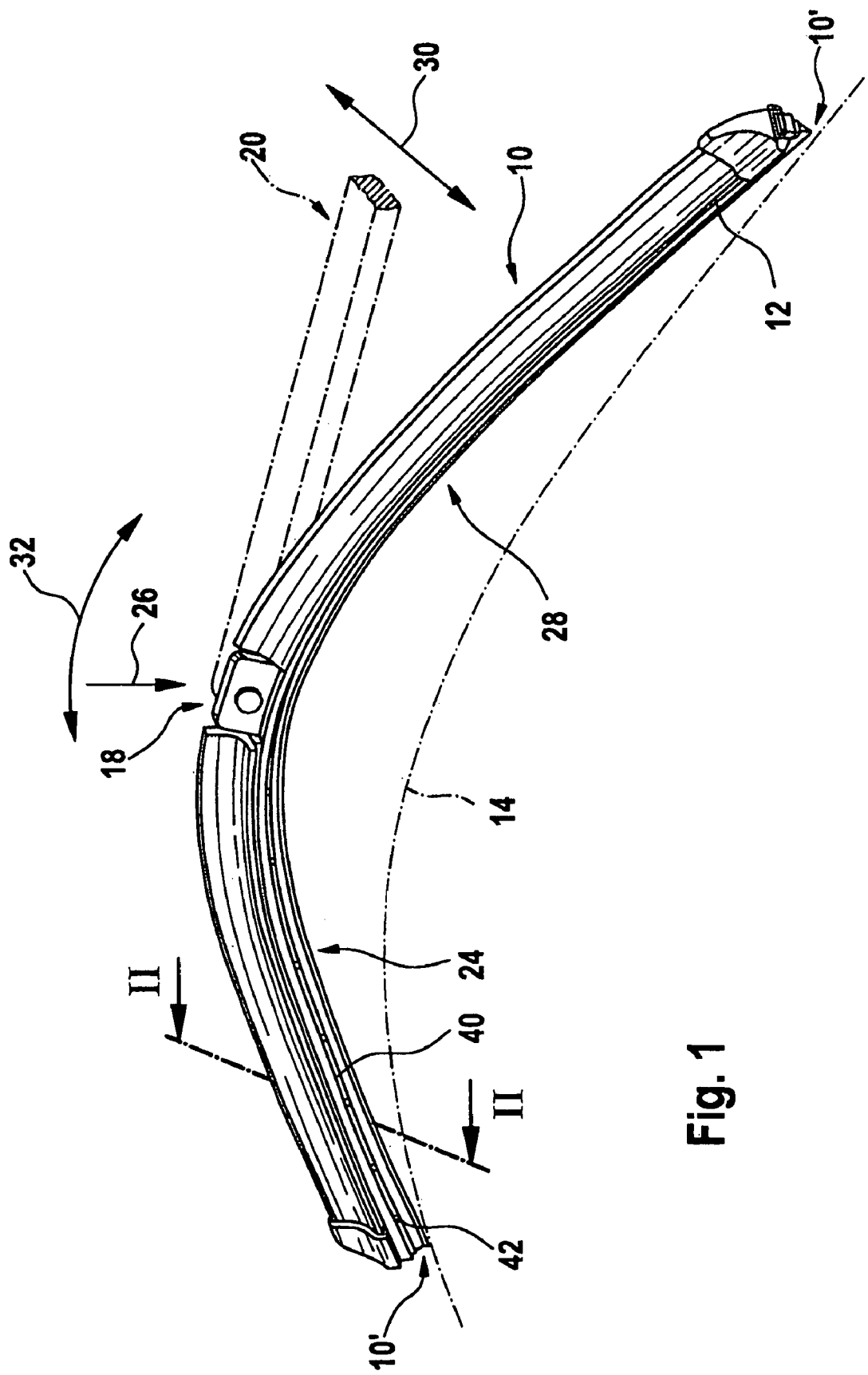
FIG. 1 A perspective representation of a wiper blade manufactured using the method in accordance with the invention with a wiper arm indicated with a dot-dash line.

A wiper blade 10 depicted in FIG. 1 features a band-like, elongated, spring elastic single or multipart supporting element 12, which is curved in the longitudinal direction in an unstressed state. Arranged on the upper or external convex band side 16 (FIGS. 1 and 2) of the supporting element facing away from the to-be-wiped window 14 in the center section of said supporting element is, e.g., a flat, connecting device 18 that is adjacent to said band side. Said connecting device can be used to detachably connect the wiper blade 10 to a driven wiper arm 20 that is guided on the body of a vehicle. An elongated, rubber elastic wiper strip 24 is arranged on the lower or internal concave band surface or band side 22 of the curved supporting element 12 that faces the window and this wiper strip extends longitudinally axially parallel to the supporting element 12. Counter connecting means (not shown in greater detail) are provided on the free end of the wiper arm, and they cooperate with the connecting device 18 of the wiper blade in the sense of an articulation.

The wiper arm 20 and thus also the wiper blade 10 are stressed in the direction of arrow 26 towards to the to-be-wiped window, whose to-be-wiped surface is indicated by a dot-dash line 14 in FIG. 1. Since the dot-dash line is supposed to depict the greatest curvature, it is clear to see that the curvature of the as yet unstressed wiper blade 10 with its ends 10' adjacent to the window 14 is greater than the maximum curvature of the window. Therefore—in an unstressed state—it has a concave progression vis-à-vis the window. Under the application force (arrow 26), the wiper blade 10 with the wiper lip 28 that performs the wiping work is applied over its entire length to the window surface 14 and goes into a working position that approximates the extended position. In the process, tension builds up in the band-like, elastic supporting element 12, which provides for the proper application of the wiper strip 24 or its wiper lip 28 over its entire length on the vehicle window 14. Because the window, which is spherically curved as a rule, does not represent a section of a spherical surface, the wiper blade 10 must be able to constantly adapt vis-à-vis the wiper arm 20 during its wiping operation (double arrow 30) to the respective position and the progression of the window surface 14. As a result, an articulated connection is required between the wiper arm 20 and wiper blade 10 that makes an oscillating movement (double arrow 32) around the articulated axis of the connecting device possible.

Figure 2:
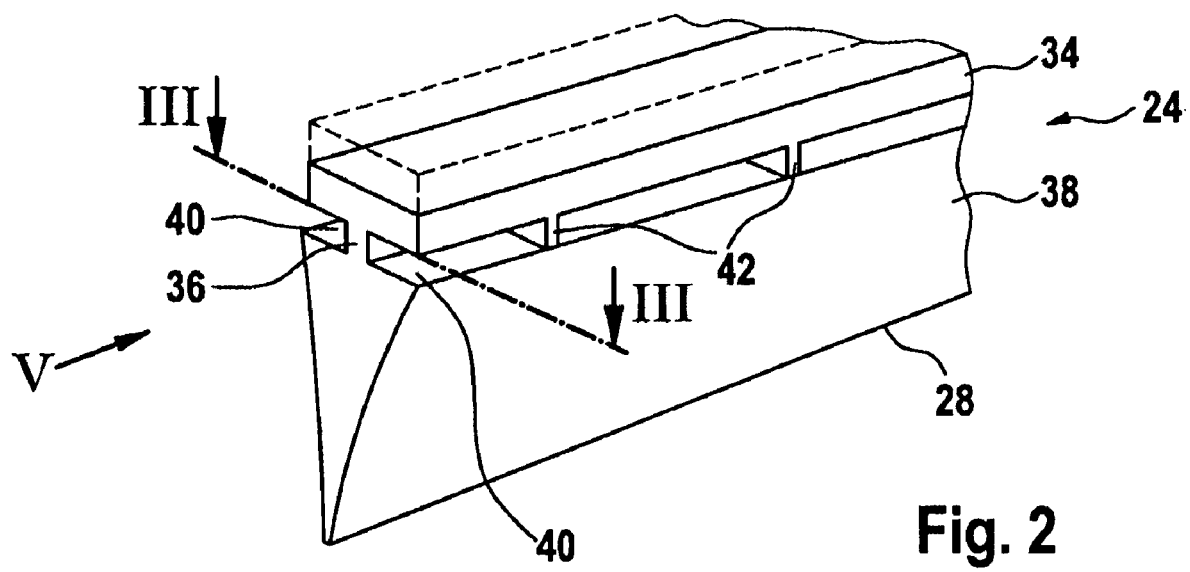
FIG. 2 A wiper strip that is enlarged as compared with FIG. 1 with the indication of a supporting element.

The wiper strip 24 depicted in FIG. 2 features a wiper strip back 34, which is connected via a tilting web 36 to a folding wedge 38 on whose underside the wiper lip 28 is arranged.

Extending on the side of the tilting web 36 are two longitudinal grooves 40 whose upper side is formed by the wiper strip back 34 and whose lower side is formed by the folding wedge 38. Webs 42 that are arranged lateral to the tilting web 36 are provided within the longitudinal grooves 40 and they are distributed over the length of the longitudinal groves 40.

Each web 42 extends from the tilting web 36 starting laterally in the direction towards the open side of the longitudinal groove 40 and connects the wiper strip back 34 to the folding wedge 38. The webs 42 are a part of the wiper strip 24 and are therefore integrally connected to the wiper strip back 34, the tilting web 36, as well as the folding wedge 38. It would also be conceivable for the webs 42 to be embodied separately and be introduced into the longitudinal grooves 40.

Figure 3:
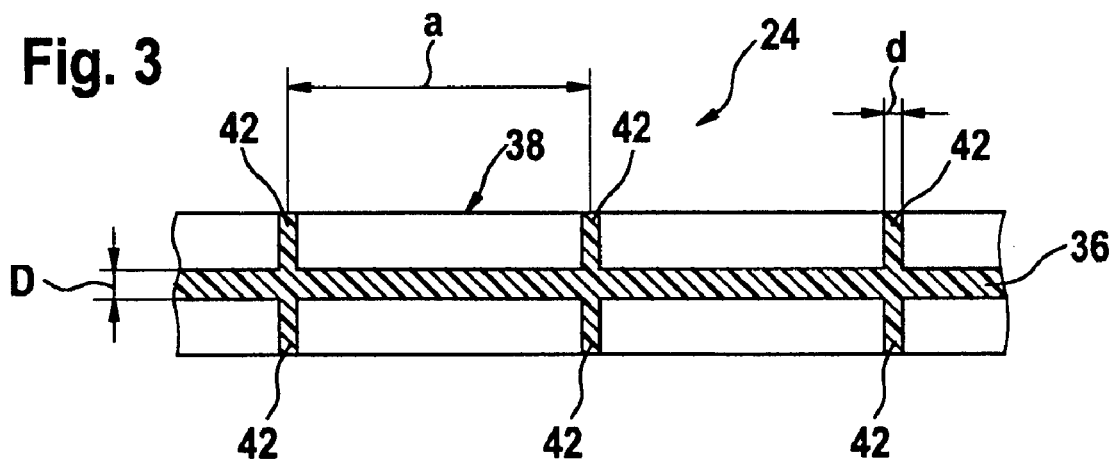
FIG. 3 A section along Line III-III in FIG. 2.
Figure 4:
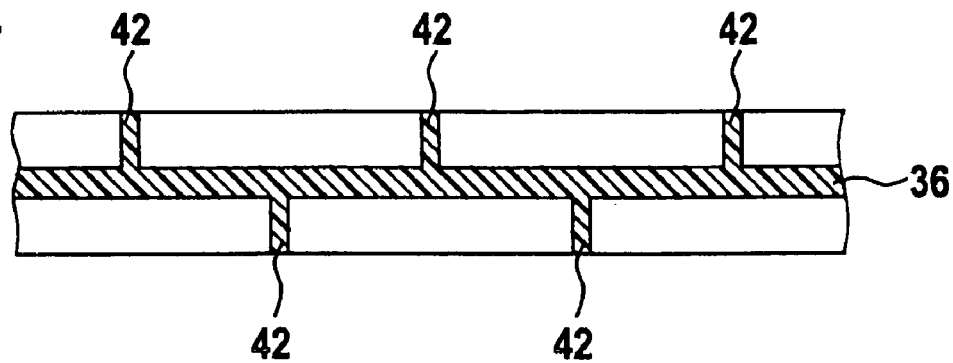
FIG. 4 A variation according to FIG. 3.

FIG. 3 shows that each web 42 extends starting from the tilting web 36 perpendicular to the tilting web 36. Furthermore, it is evident that the webs 42 are arranged on both sides of the tilting web 36. If the webs 42 in FIG. 3 are arranged in alignment on both sides of the tilting web 36, then FIG. 4 shows the webs 42 arranged in an offset manner on the two sides.

The distance a of the webs 42 from one another should be between 10 mm and 50 mm and is preferably at 20 mm. In the case of webs 42 that are arranged in an offset manner as shown in FIG. 4, a distance of 10 mm respectively is produced if one considers the webs 42 on both sides of the tilting web 36. The webs 42 are distributed uniformly over the length of the wiper strip 24. However, it is also conceivable, e.g., for reasons related to resonance, to vary the distance a over the length of the wiper strip 24.

The tilting web 36 represents the actual effective connection between the wiper strip back 34 and the folding wedge 38 and must be dimensioned accordingly. The webs 42 are kept smaller in terms of their thickness d than the thickness D of the tilting web 36. In a preferred embodiment, the thickness d of the webs 42 is one half of the thickness D of the tilting web 36.

Figure 5:
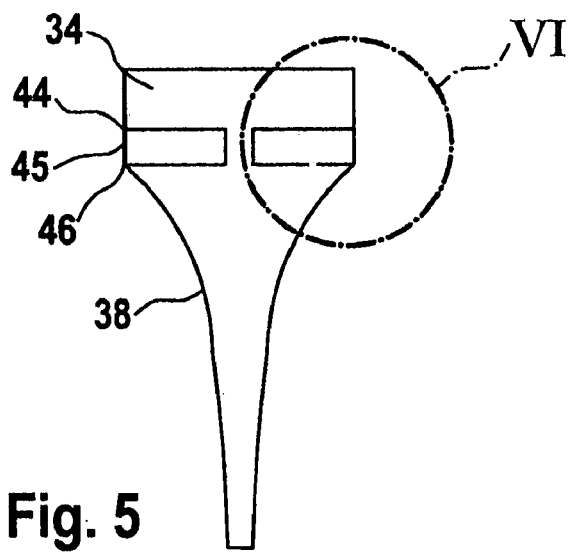
FIG. 5 A view along Arrow V in FIG. 2.

As mentioned, the webs 42 represent a connection between the wiper strip back 34 and the folding wedge 38 and extend starting from the tilting web 36 to respectively an open side of the longitudinal grooves 40. In this case, it is clear that for manufacturing reasons it is meaningful to connect the webs 42 to the tilting web 36. However, it would also be conceivable to leave a gap between the webs 42 and the tilting web 36. It is a similar situation with the open sides of the longitudinal grooves 40. The webs 42 connect an outer edge 44 of the wiper strip back 34 to an outer edge 46 of the folding wedge 38 in a straight line 45, as depicted in FIG. 5.

Figure 6:
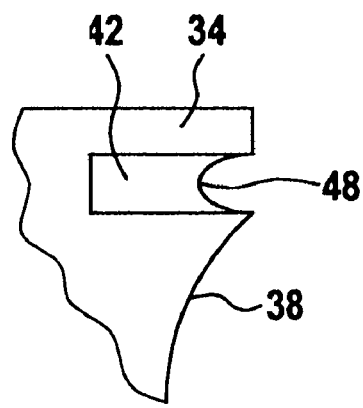
FIG. 6 A variation of Detail VI in FIG. 5.
Figure 7:
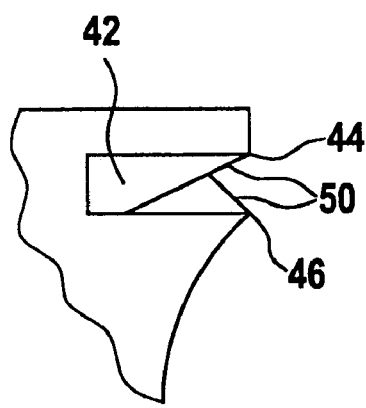
Figure 8:
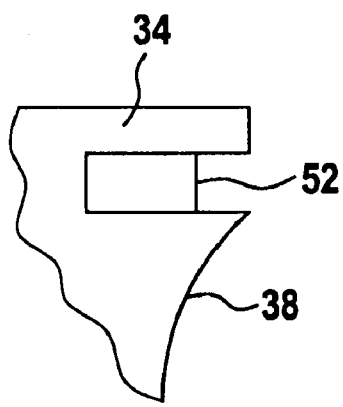

FIGS. 6 and 8 represent variations of this. In FIG. 6, the connection of the two outer edges 44 and 46 is embodied in the form a concave profile 48, which has the advantage of a slight notch effect. The example shown in FIG. 7 is one of three variations. The outer sides 50 of the webs 42 run diagonally and are connected to only one of the outer edges 44 or 46. In this case, it is possible to embody all webs 42 running diagonally into the longitudinal groove 40 starting from the outer edge 44 or from the outer edge 46 or else alternatingly from the outer edge 44 and the outer edge 46. In a further variation according to FIG. 8, the outer sides 52 of each web 42 are offset into the respective longitudinal groove 40. Consequently, they do not make contact with any of the outer edges 44 or 46.

The goal of reducing the folding-back noise of the wiper blade 10 or even eliminating it is achieved with each of the variations according to FIGS. 5 through 8. Because of the corresponding embodiment of the outer sides of the webs 42, it is possible to react to different requirements. What is essential is that the spring characteristic being assigned to the webs 42 can be heavily influenced by the shape of the outer sides. It can be embodied to be, e.g., steeper or flatter or to have a degressive or progressive course. Combining different shapes of the outer sides of the webs 42 with one another is also conceivable. This can occur with successive webs 42 or also within a web 42 on its outer edge.

Figure 9:
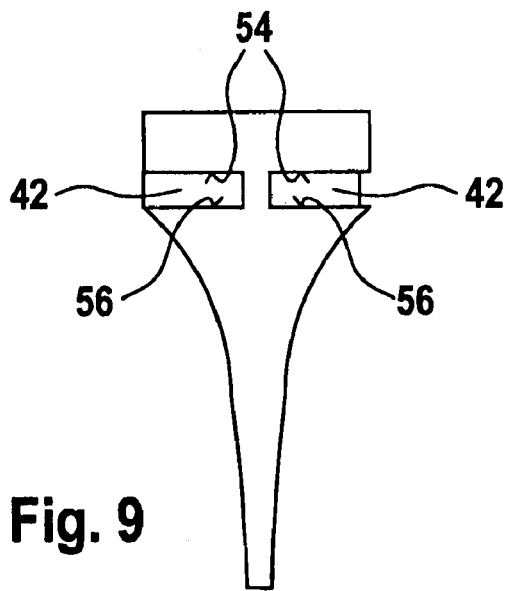
FIG. 9 Additional variations of FIG. 1.

FIG. 9 shows that the webs 42 are each formed on only one side 54 or 56 and only abut or even have no distance on the opposing sides 56 or 54, however. The embodiment can also be accomplished such that successive webs 42 are formed alternating on its upper side 54 and on its lower side 56 and are each free on the opposing side. In this way, it is possible to exert a compressive force on the folding wedge 38 via the webs 42 starting from the wiper strip back 34, but a tensile force does not occur.

It is clear that, in the case of wipers blades 10 with several tilting webs 36 arranged above one another, corresponding webs 42 can be assigned to each of the tilting webs 36. Even in the case of these higher wiper blades, it is thereby possible to have a positive effect on the folding-back noise.

The invention claimed is:

1. A wiper blade (10) with a band-like, elongated, spring elastic single or multipart supporting element (12) that has a longitudinal axis and that, in an unstressed state, is curved in the longitudinal direction and has a connection device (18) arranged in a central portion of a convex, top band side (16) of the supporting element, the connection device butting against the top band side and being intended for releasable connection to a driven wiper arm (20), and an elongate, elastomeric wiper strip (24) arranged on a concave, bottom band side (22) of the supporting element, the wiper strip extending parallel to the longitudinal axis of the supporting element (12) and comprising a folding wedge (38) and a wiper-strip back (34), which are connected to one another via a tilting web (36), characterized in that additional webs (42) are arranged laterally in respect of the tilting web (36), in a longitudinal groove (40), and the additional webs, starting from the tilting web (36), extend perpendicularly to the tilting web to an open side of the longitudinal groove (40), have outer sides (50) reaching at least as far as one of an outer edge (44) of the wiper-strip back (34) or an outer edge (46) of the folding wedge (38), and connect the wiper-strip back (34) to the folding wedge (38).

2. The wiper blade (1) as claimed in claim 1, wherein the tilting web has opposite sides, and characterized in that the additional webs (42) are arranged on both sides of the tilting web (36).

3. The wiper blade (10) as claimed in claim 2, characterized in that the additional webs (42) are located opposite one another on the opposite sides.

4. The wiper blade (10) as claimed in claim 3, characterized in that a spacing (a) between the additional webs (42) is between 10 mm and 50 mm.

5. The wiper blade (10) as claimed in claim 4, characterized in that a thickness (d) of the additional webs (42) is smaller than a thickness (D) of the tilting web (36).

6. The wiper blade (10) as claimed in claim 5, characterized in that the additional webs (42) connect the outer edge (44) of the wiper-strip back (34) and the outer edge (46) of the folding wedge (38) in a straight line (45).

7. The wiper blade (10) as claimed in claim 5, characterized in that outwardly oriented end sides of the additional webs (42) each form a concave profile (48) by means of which the adjacent outer edges (44, 46) of the wiper-strip back (34) and of the folding wedge (38) are connected to one another.

8. The wiper blade (10) as claimed in claim 5, characterized in that the outer sides (50) of the additional webs (42) run diagonally inward in the direction of the tilting web (36) from the outer edge (44) of the wiper-strip back (34) or from the outer edge (46) of the folding wedge (38).

9. The wiper blade (10) as claimed in claim 8, characterized in that slopes of the outer sides (50) of successive additional webs (42) run inward in the direction of the tilting web (36) in an alternating manner from the outer edge (44) of the wiper strip back (34) and from the outer edge (46) of the folding wedge (38).

10. The wiper blade (10) as claimed in claim 2, characterized in that the additional webs (42) on one side are offset in the longitudinal direction in relation to the additional webs (42) on the other side.

11. The wiper blade (10) as claimed in claim 10, characterized in that a spacing (a) between the additional webs (42) is between 10 mm and 50 mm.

12. The wiper blade (10) as claimed in claim 11, characterized in that a thickness (d) of the additional webs (42) is smaller than a thickness (D) of the tilting web (36).

13. The wiper blade (10) as claimed in claim 12, characterized in that the additional webs (42) connect the outer edge (44) of the wiper-strip back (34) and the outer edge (46) of the folding wedge (38) in a straight line (45).

14. The wiper blade (10) as claimed in claim 12, characterized in that outwardly oriented end sides of the additional webs (42) each form a concave profile (48) by means of which the adjacent outer edges (44, 46) of the wiper-strip back (34) and of the folding wedge (38) are connected to one another.

15. The wiper blade (10) as claimed in claim 12, characterized in that the outer sides (50) of the additional webs (42) run diagonally inward in the direction of the tilting web (36) from the outer edge (44) of the wiper-strip back (34) or from the outer edge (46) of the folding wedge (38).

16. The wiper blade (10) as claimed in claim 15, characterized in that slopes of the outer sides (50) of successive additional webs (42) run inward in the direction of the tilting web (36) in an alternating manner from the outer edge (44) of the wiper strip back (34) and from the outer edge (46) of the folding wedge (38).

17. The wiper blade (10) as claimed in claim 1, characterized in that a spacing (a) between the additional webs (42) is between 10 mm and 50 mm.

18. The wiper blade (10) as claimed in claim 1, characterized in that a thickness (d) of the additional webs (42) is smaller than a thickness (D) of the tilting web (36).

19. The wiper blade (10) as claimed in claim 1, characterized in that the additional webs (42) connect the outer edge (44) of the wiper-strip back (34) and the outer edge (46) of the folding wedge (38) in a straight line (45).

20. The wiper blade (10) as claimed in claim 1, characterized in that outwardly oriented end sides of the additional webs (42) each form a concave profile (48) by means of which the adjacent outer edges (44, 46) of the wiper-strip back (34) and of the folding wedge (38) are connected to one another.

21. The wiper blade (10) as claimed in claim 1, characterized in that the outer sides (50) of the additional webs (42) run diagonally inward in the direction of the tilting web (36) from the outer edge (44) of the wiper-strip back (34) or from the outer edge (46) of the folding wedge (38).

22. The wiper blade (10) as claimed in claim 21, characterized in that slopes of the outer sides (50) of successive additional webs (42) run inward in the direction of the tilting web (36) in an alternating manner from the outer edge (44) of the wiper strip back (34) and from the outer edge (46) of the folding wedge (38).

* * * * *